(12) United States Patent
Kato

(10) Patent No.: US 8,104,664 B2
(45) Date of Patent: Jan. 31, 2012

(54) FRICTION STIR WELDING APPARATUS FOR OVERLAPPED JOINTS

(75) Inventor: Yoshinori Kato, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/732,224

(22) Filed: Mar. 26, 2010

(65) Prior Publication Data

US 2011/0101071 A1   May 5, 2011

(30) Foreign Application Priority Data

Oct. 29, 2009   (JP) ................. 2009-248891

(51) Int. Cl.
*B23K 20/12*   (2006.01)
(52) U.S. Cl. ............. 228/112.1; 228/113; 228/114; 228/2.1
(58) Field of Classification Search .......... 228/112.1, 228/113
See application file for complete search history.

(56) References Cited

U.S. PATENT DOCUMENTS

| 6,676,008 | B1 | 1/2004 | Trapp et al. | |
|---|---|---|---|---|
| 2008/0251571 | A1* | 10/2008 | Burford | 228/114.5 |

FOREIGN PATENT DOCUMENTS

| JP | 2001-340976 A | | 12/2001 |
|---|---|---|---|
| JP | 2002-035962 A | | 2/2002 |
| JP | 2002-035964 A | | 2/2002 |
| JP | 2003-326371 A | | 11/2003 |
| JP | 2004-141897 A | | 5/2004 |
| JP | 2004141897 A | * | 5/2004 |

OTHER PUBLICATIONS

Computer English Translation of JP 2004141897 A.*
Computer English Translation of JP2002035964 A.*
EP Search Report for Application No. 10168969.3 dated Feb. 24, 2011.
Japanese Office Action for 2009248891 mailed Nov. 8, 2011.

* cited by examiner

*Primary Examiner* — Jessica L Ward
*Assistant Examiner* — Erin Saad
(74) *Attorney, Agent, or Firm* — Lowe Hauptman Ham & Berner LLP

(57) ABSTRACT

In a friction stir welding apparatus for overlapped joints provided with a rotor having a shoulder and a probe that is provided so as to protrude from the shoulder of the rotor and also so as to be disposed concentrically with the center axis of the rotor, a helical groove is formed in the peripheral surface of the probe, from the tip of the probe toward the shoulder, and the depth of the groove is formed so as to gradually decrease from the tip of the probe toward the shoulder.

8 Claims, 6 Drawing Sheets

FIG.7
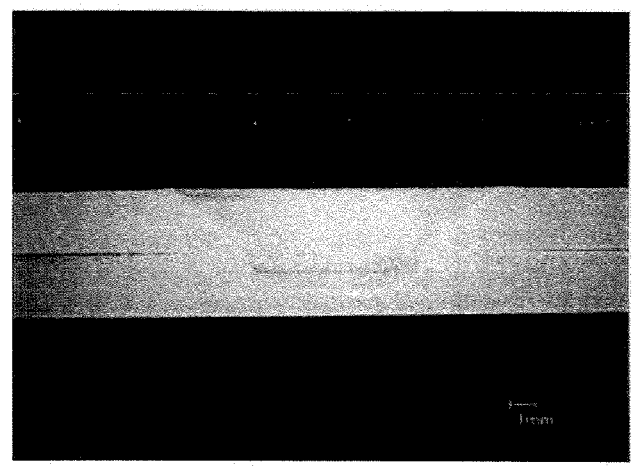
FIG.9(a)
(PRIOR ART)
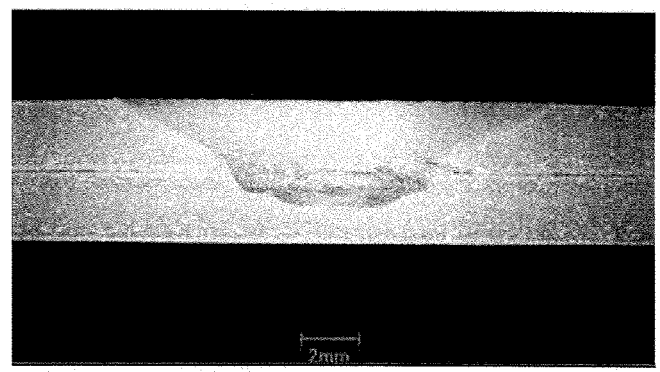
FIG.9(b)　　　FIG.9(c)　　　FIG.9(d)
(PRIOR ART)　(PRIOR ART)　(PRIOR ART)
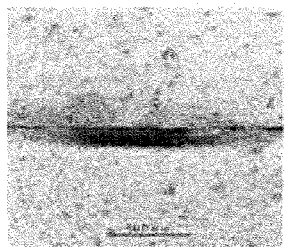 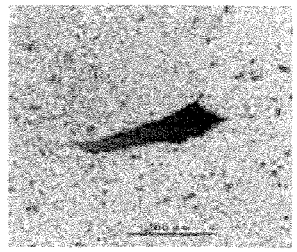 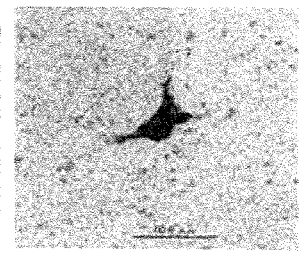

FRICTION STIR WELDING APPARATUS FOR OVERLAPPED JOINTS

RELATED APPLICATION

The present application is based on, and claims priority from, Japanese Application Number 2009-248891, filed Oct. 29, 2009, the disclosure of which is hereby incorporated by reference herein in its entirety.

FIELD OF THE INVENTION

The present invention relates to a friction stir welding apparatus for overlapped joints, and more specifically, relates to a friction stir welding apparatus used when overlap-joining two members to be joined that are made of metal.

BACKGROUND ART

In the past, various friction stir welding apparatuses for overlapped joints have been proposed as apparatuses for overlapping and joining two members to be joined (for example, refer to JP2002-035962 and JP2002-035964).

FIG. 8 shows an example of a conventional friction stir welding apparatus for overlapped joint. As shown in FIG. 8, the friction stir welding apparatus 21 for overlapped joints joins a pair of members to be joined 22, 23 that are caused to overlap. The apparatus 21 comprises a rotor 24 that has a shoulder 25, and a cylindrical probe 26 provided so as to protrude from the shoulder 25. The probe 26 is formed with a diameter that is smaller than that of the rotor 24, and is disposed concentrically with the center axis C of the rotor 24.

When the pair of members 22, 23 are overlap joined, while rotating the rotor 24 in the direction of the arrow R about the center axis C of the rotor 24, the friction stir welding apparatus 21 for overlapped joints is pressed up against the surface of the upper member to be joined 22 of the overlapped members 22, 23 and caused to move along a prescribed joining line (not illustrated). When this is done, the members to be joined 22, 23 in the region surrounding the probe soften, and the softened members 22, 23 are stirred and flow plastically. The result is the formation of a joint 27 along the prescribed joining line.

FIG. 9 is a photomicrograph of a joint formed using a conventional friction stir welding apparatus for overlapped joints. As shown in FIG. 9(b) through (d), in a conventional friction stir welding apparatus for overlapped joints 21, there is the problem that it is difficult for the softened members to be joined 22, 23 in the region surrounding the probe 26 to flow upward and downward, making it easy for void defects to occur in the region surrounding the tip 26a of the probe 26.

Also, in the prior art, a friction stir welding apparatus for overlapped joints was proposed for the purpose of solving this problem of void defects.

FIG. 10 shows another example of a conventional friction stir welding apparatus for overlapped joints. In the friction stir welding apparatus 31 for overlapped joints as shown in FIG. 10, a helical groove 37 is formed in the peripheral surface of the probe 36, from the tip 36a of the probe 36 to the shoulder 35 of the rotor 34.

In a friction stir welding apparatus for overlapped joints such as this, as shown in FIG. 10, the softened members to be joined 32, 33 in the region surrounding the probe 36 flow upward and downward because of the helical groove 37, thereby enabling prevention of void defects in the region surrounding the tip 36a of the probe 36.

In the above-described constitution, however, the upward and downward flow of the members to be joined 32, 33 in the region near the boundary face 38 between the members to be joined 32, 33 increases, so that the softened members to be joined flow so as to be curled upward after flowing downward, as shown in FIG. 10. As a result, as shown in FIG. 11, an oxide film at the boundary face 38 between the members to be joined 32, 33 remains in a condition of being curled upward.

When an oxide film, which is a location having a weak cohesive force, remains in an upwardly curled condition, as shown in FIG. 12, the actual plate thickness $t_1$ of the upper members 32 becomes thinner than the original plate thickness $t_0$ thereof, thereby resulting in a reduction of the strength of the joint in the members to be joined 32, 33. For example, in a case such as shown in FIG. 12, in which mutually opposing forces act which are parallel to the boundary face 38 between the members 32, 33 (in the tensile shearing direction), there is the problem of a tendency for a crack to occur in the residual oxide film 39.

SUMMARY

The present invention was made in consideration of the above-described situation and has as an object to provide a friction stir welding apparatus for overlapped joints that can prevent a reduction of the strength of the joint between a pair of members to be joined by suppressing the upward curling of the oxide film.

In order to solve the above-described problem in the prior art, the present invention is a friction stir welding apparatus for overlapped joints provided with a rotor having a shoulder and a probe that is provided so as to protrude from the shoulder of the rotor and also so as to be disposed concentrically with the center axis of the rotor, wherein a helical groove is formed in the peripheral surface of the probe, from the tip of the probe toward the shoulder, the depth of the groove being formed so as to gradually decrease from the tip of the probe toward the shoulder.

According to the present invention, the helical groove extends from the tip of the probe to a position beyond the overlapping plane of the pair of members to be joined when the probe is inserted into the pair of overlapped members to be joined.

According to the present invention, a channel-shaped groove is provided in the peripheral surface of the probe that extends from the tip of the probe along the direction of the center axis of the probe.

Also, according to the present invention, the channel-shaped groove extends from the tip of the probe to a position beyond the overlapping plane of the pair of members to be joined when the probe is inserted into the pair of overlapped members to be joined.

Because the present invention is a friction stir welding apparatus for overlapped joints provided with a rotor having a shoulder and a probe that is provided so as to protrude from the shoulder of the rotor and also so as to be disposed concentrically with the center axis of the rotor, wherein a helical groove is formed in the peripheral surface of the probe, from the tip of the probe toward the shoulder, the depth of the groove being formed so as to gradually decrease from the tip of the probe toward the shoulder, the upward and downward flow of the members to be joined occurring because of the helical groove is reduced increasingly toward the shoulder. As a result, because the upward and the downward flow of the joint in the region near the boundary face between the members to be joined is small compared with the prior art of FIG. 10, in which a helical groove is provided, it is possible to prevent the oxide film at the boundary face between the members to be joined from remaining in the condition of being curled upward. Therefore, there is no reduction of the strength of the joint in the pair of members to be joined.

Because according to the friction stir welding apparatus for overlapped joints of the present invention the helical groove extends from the tip of the probe to a position beyond the overlapping plane of the pair of members to be joined when the probe is inserted into the pair of overlapped members to be joined, the upward and downward flow of the members to be joined in the region near the boundary face of the members to be joined is suppressed to the extent that the oxide film at the boundary face between the members to be joined is not curled upward. It is therefore possible to prevent the occurrence of void defects in the region near the tip of the probe caused by upward and downward flow of the members to be joined, and also possible to prevent the oxide film at the boundary face between the members to be joined from being curled upward.

Also, because according to the friction stir welding apparatus for overlapped joints a channel-shaped groove is provided in the peripheral surface of the probe that extends from the tip of the probe along the direction of the center axis of the probe, when the rotor is caused to rotate, it is possible by the concavity and convexity in the peripheral surface of the probe, to cause flow of the members to be joined in the region surrounding the probe in the horizontal direction (direction perpendicular to the center axis of the probe). When this occurs, because the upward and downward flow of the members to be joined occurring due to the helical groove is suppressed, it is possible to effectively prevent the oxide film at the boundary face between the members to be joined from being curled upward.

Also, because according to a friction stir welding apparatus for overlapped joints of the present invention the channel-shaped groove extends from the tip of the probe to a position beyond the overlapping plane of the pair of members to be joined when the probe is inserted into the pair of overlapped members to be joined, the horizontal-direction flow in the region near the boundary face between the members to be joined becomes large, and it is possible to more effectively suppress the upward and the downward flow in the region near the boundary face between the members to be joined. The result is that it is possible to effectively prevent the oxide film at the boundary face between the members to be joined from being curled upwardly.

BRIEF DESCRIPTION OF THE DRAWINGS

FIG. 7 is a photomicrograph of a joint formed using a friction stir welding apparatus for overlapped joints according to the second embodiment of the present invention (magnification: 5×).

FIGS. 9(a)-(d) are photomicrographs of joints formed using the friction stir welding apparatus for overlapped joints of FIG. 8, (a) being a photomicrograph showing the overall joint (magnification: 6×) and (b) to (d) being enlarged (magnification: 400×) photomicrographs showing void defects occurring in the region near the tip of the probe.

DETAILED DESCRIPTION

First Embodiment

Figure 1:
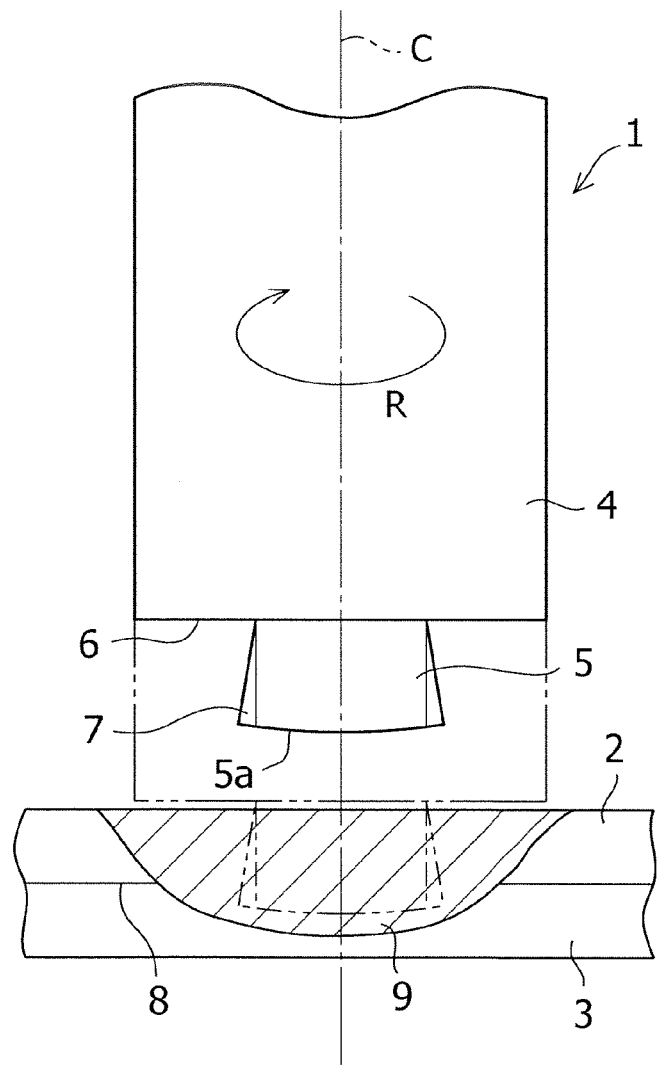
FIG. 1 is a side elevation of a friction stir welding apparatus for overlapped joints according to a first embodiment of the present invention.

A friction stir welding apparatus for overlapped joints according to the first embodiment of the present invention is described below, with references made to the accompanying drawings. FIG. 1 is a side elevation of a friction stir welding apparatus for overlapped joints according to the first embodiment of the present invention, FIG. 2 is an enlarged side elevation of the probe of the friction stir welding apparatus for overlapped joints according to the first embodiment of the present invention, and FIG. 3 is a drawing of the friction stir welding apparatus for overlapped joints of FIG. 1, viewed from below.

As shown in FIG. 1, the friction stir welding apparatus for overlapped joints 1 of the first embodiment overlaps and joins a pair of members to be joined 2, 3, and is provided with a cylindrical rotor 4 and a cylindrical probe 5 provided so as to protrude from the rotor 4.

As shown in FIG. 1, the rotor 4 is provided with a shoulder 6 that comes into contact with the surface of the upper member to be joined 2 of the pair of members to be joined 2, 3, and is constituted so as to rotate in the direction of the arrow R about the center axis C. The probe 5 is formed with a diameter that is smaller than that of the rotor 4, and is disposed concentrically with the center axis C of the rotor 4.

Figure 2:
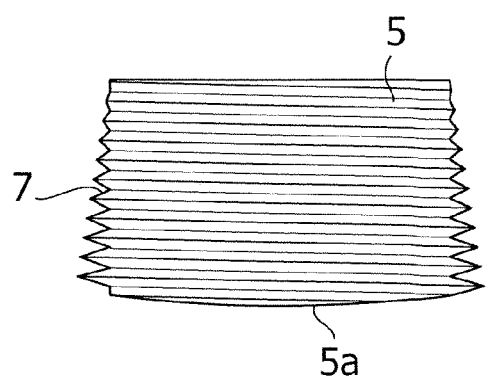
FIG. 2 is an enlarged side elevation of the probe of the friction stir welding apparatus for overlapped joints according to the first embodiment of the present invention.
Figure 3:
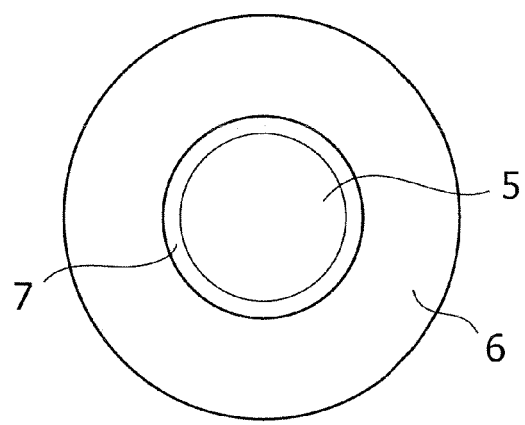
FIG. 3 is a drawing of the friction stir welding apparatus for overlapped joints of FIG. 1, viewed from the bottom.

As shown in FIG. 2 and FIG. 3, a helical groove 7 is formed in the peripheral surface of the probe 5, from the tip 5a of the probe 5 toward the shoulder 6. As shown in FIG. 2, the helical groove 7 is constituted to have a cross-section that is a V-shaped left-hand thread. Also, the helical groove 7 extends from the tip 5a of the probe 5 to a position beyond a boundary plane (overlapping face) 8 between the pair of members to be joined 2, 3 up until the shoulder 6 when the probe 5 is inserted into the pair of overlapped members 2, 3.

In the first embodiment, as shown in FIG. 2, the depth of the helical groove 7 is formed so as to gradually decrease from the tip 5a of the probe 5 toward the shoulder 6. By doing this, in the first embodiment the upward and downward flow of the members to be joined 2, 3 occurring because of the helical groove 7 gradually decreases toward the shoulder 6.

Next, the procedure for joining the pair of members to be joined 2, 3 using the friction stir welding apparatus 1 of the first embodiment will be described.

As shown in FIG. 1, first the pair of members to be joined 2, 3 are overlapped and the friction stir welding apparatus 1 is pressed up against the surface of the upper member to be joined 2 as the rotor 4 is caused to rotate. When this is done, in this embodiment, the rotor is caused to rotate in the direction of the arrow R.

Then, the rotor 4 is pressed inward to the point at which the shoulder 6 of the rotor 4 comes into contact with the surface of the upper member, in which condition the rotor 4 is moved along a prescribed joining line (not illustrated). By doing this, the softened members to be joined 2, 3 in the region surrounding the probe 5 are stirred and flow plastically, the result being the formation of a joint 9.

According to the friction stir welding apparatus 1 of the first embodiment, because in a friction stir welding apparatus for overlapped joints provided with a rotor 4 having a shoulder 6 and a probe 5 that is provided so as to protrude from the shoulder 6 of the rotor 4 and also so as to be disposed concentrically with the center axis of the rotor, a helical groove 7 is formed in the peripheral surface of the probe 5, from the tip 5a of the probe 5 up to the shoulder 6, and the depth of the groove 7 is formed so as to gradually decrease from the tip 5a of the probe 5 toward the shoulder 6, the closer to the shoulder 6, the smaller is the upward and downward flow of members to be joined 2, 3 occurring because of the helical groove 7. That is, not only is the occurrence of void defects in the region near the tip 5a of the probe 5 by the upward and downward flow of the members to be joined 2, 3 prevented, but also it is possible to prevent the upward curling of the oxide film at the boundary plane 8 between the members 2, 3. Therefore, the strength of the joint 9 in the members to be joined 2, 3 is not reduced.

Second Embodiment

Figure 4:
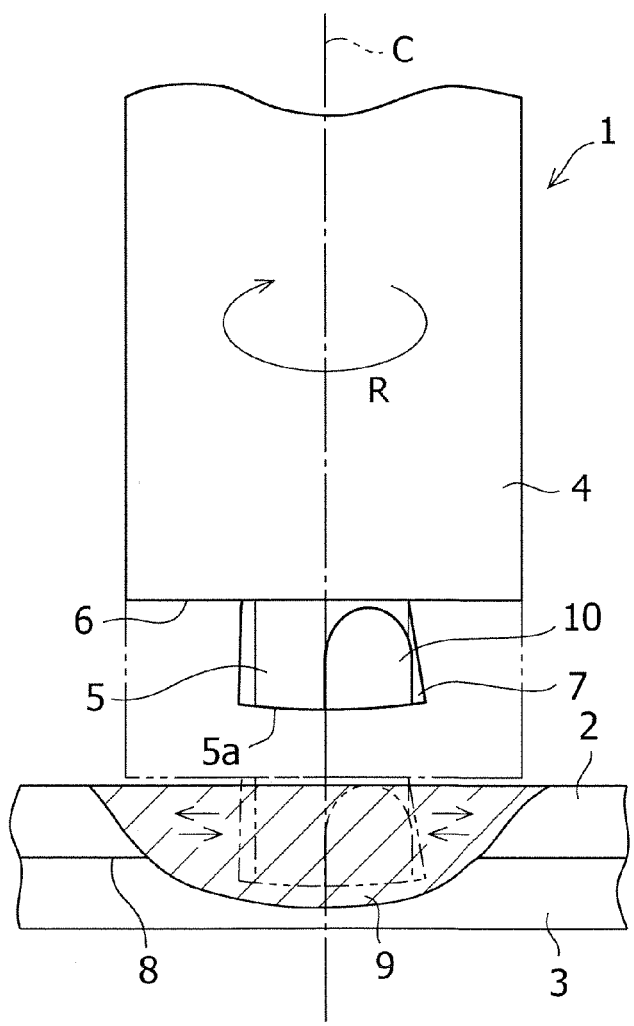
FIG. 4 is a side elevation of a friction stir welding apparatus for overlapped joints according to a second embodiment of the present invention.
Figure 5:
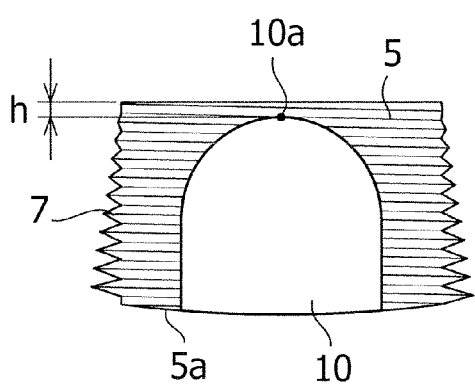
FIG. 5 is an enlarged side elevation of the probe of the friction stir welding apparatus for overlapped joints according to the second embodiment of the present invention.
Figure 6:
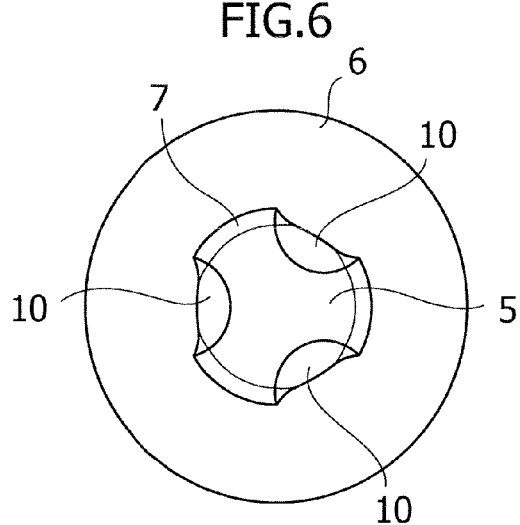
FIG. 6 is a drawing of the friction stir welding apparatus for overlapped joints of FIG. 4, viewed from the bottom.
Figure 8:
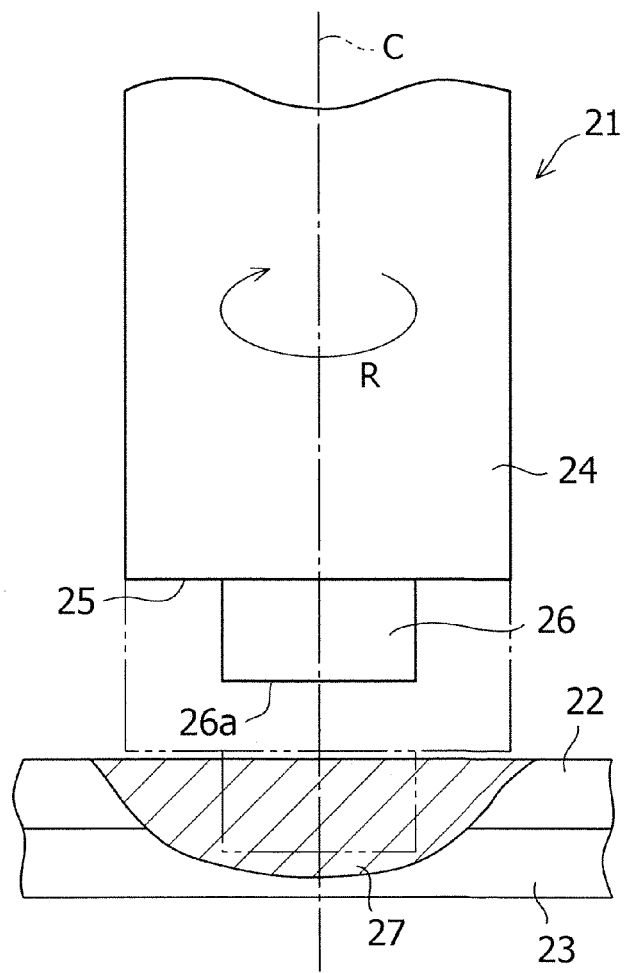
FIG. 8 is a side elevation of a conventional friction stir welding apparatus for overlapped joints.
Figure 10:
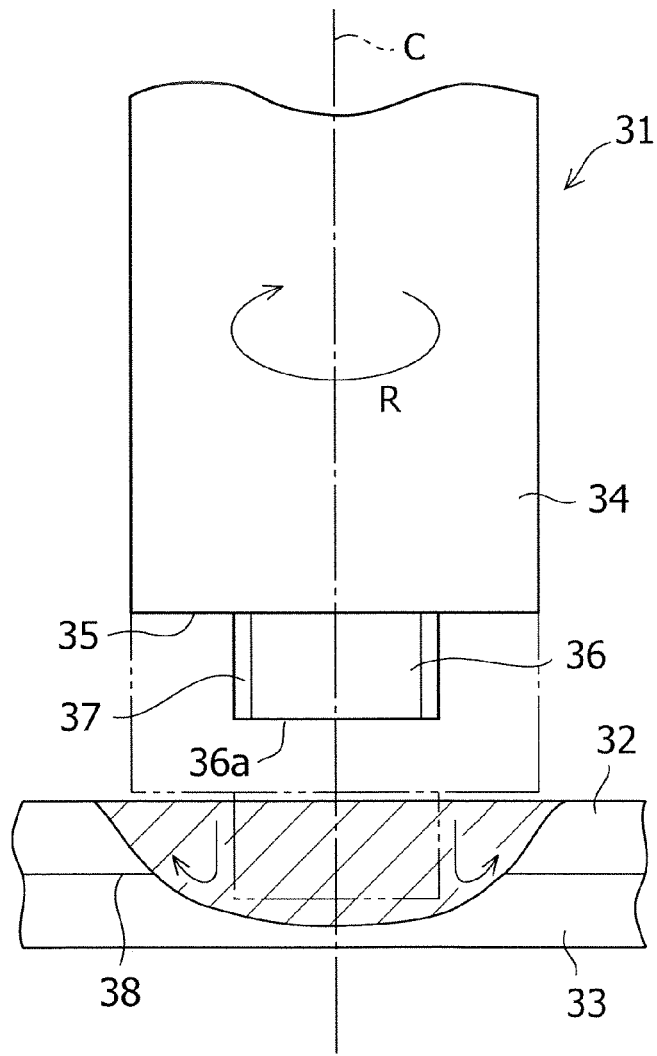
FIG. 10 is a side elevation of a different conventional friction stir welding apparatus for overlapped joints.
Figure 12:
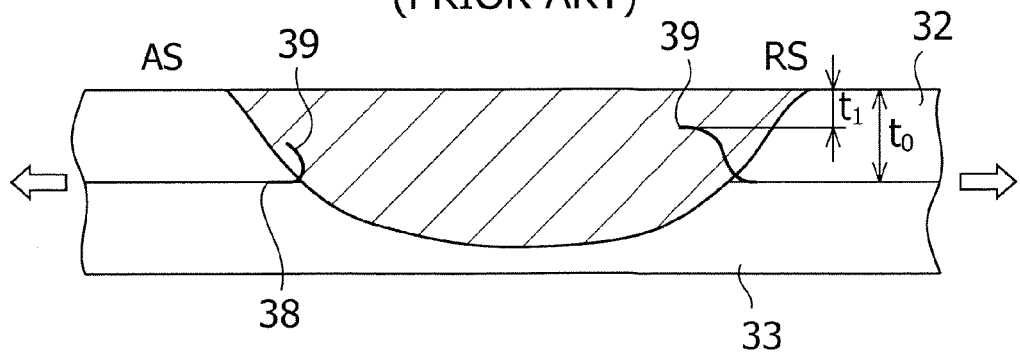
FIG. 12 is a cross-sectional view of the joint forming using the friction stir welding apparatus for overlapped joints of FIG. 10.
Figure 11A:
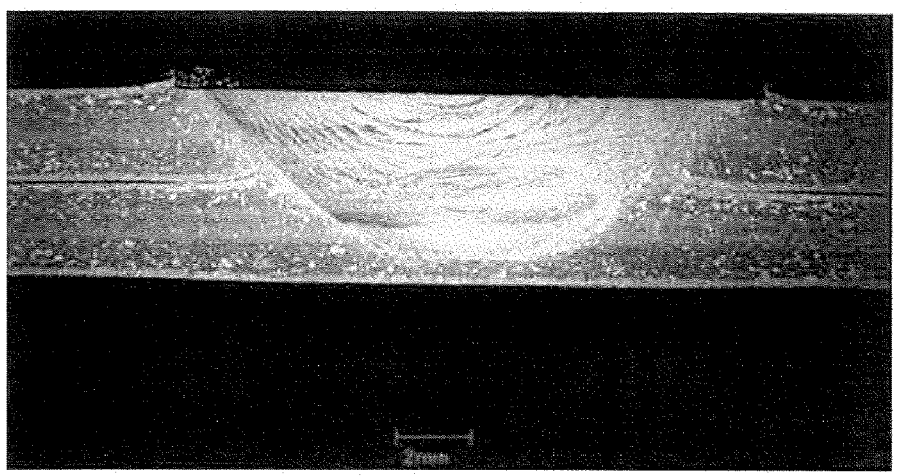
FIGS. 11(a)-(c) are photomicrographs of the joints formed using the friction stir welding apparatus for overlapped joints of FIG. 10, (a) showing the overall joint (magnification: 6×), (b) being a photomicrograph (magnification: 25×) showing the upward curling of the oxide film on the advancing side, and (c) being a photomicrograph (magnification: 25×) showing the upward curling of the oxide film on the retreating side.
Figure 11B:
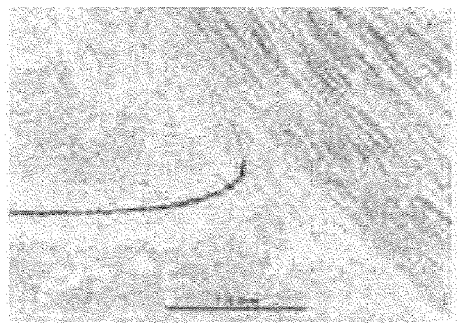
Figure 11C:
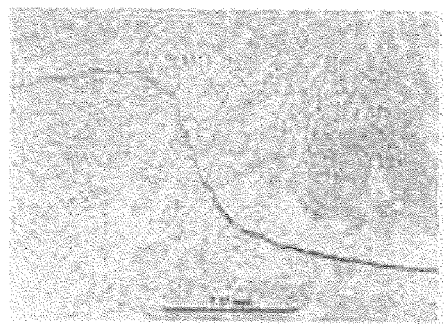

A friction stir welding apparatus for overlapped joints according to the second embodiment of the present invention is described below, with references made to the accompanying drawings. FIG. 4 is a side elevation of a friction stir welding apparatus for overlapped joints according to the second embodiment of the present invention, FIG. 5 is an enlarged side elevation of the probe of the friction stir welding apparatus for overlapped joints according to the second embodiment of the present invention, and FIG. 6 is a drawing of the friction stir welding apparatus for overlapped joints of FIG. 4, viewed from below. Elements in this embodiment that are the same as in the above-described embodiment are assigned the same reference symbols and description is not repeated.

In the second embodiment, as shown in FIG. 4 and FIG. 5, three channel-shaped grooves 10 are provided in the peripheral surface of the probe 5 so as to extend along the direction of the center axis C of the probe 5 from the tip 5a of the probe 5 toward the shoulder 6.

As shown in FIG. 5, the end parts of the three channel-shaped grooves 10 on the shoulder side are formed so as to be arc-shaped when viewed from the side. Also, as shown in FIG. 6, the cross-section of the three channel-shaped grooves 10 is formed to have the shape of an arc, and each is positioned in the peripheral direction of the probe 5 at a uniform spacing.

As shown in FIG. 4, the channel-shaped grooves 10 extend from the tip 5a of the probe 5 to a position beyond the boundary plane 8 of the pair of members to be joined 2, 3 when the probe 5 is inserted into the overlapped pair of members 2, 3. Also, as shown in FIG. 5, the channel-shaped grooves 10 are formed so that the shoulder ends 10a thereof are spaced from the shoulder 6 by a prescribed distance h (for example, 0.2 mm).

By virtue of the above-noted constitution, in the second embodiment as shown in FIG. 4, when the rotor 4 is caused to rotate, it is possible by the concavity and convexity in the peripheral surface of the probe 5, to cause flow of the members to be joined 2, 3 in the horizontal direction (direction perpendicular to the center axis C of the probe 5) in the region surrounding the probe 5. When this occurs, it is possible by this horizontal flow of the members to be joined 2, 3, to suppress the upward and downward flow of the members to be joined occurring due to the helical groove 7.

FIG. 7 shows a photomicrograph of the joint 9 formed using the friction stir welding apparatus 1 according to the second embodiment.

As shown in FIG. 7, in the second embodiment, because the upward and downward flow occurring because of the helical groove 7 is suppressed by the horizontal flow, a joint is formed without upward curling of the oxide film at the boundary plane between the members to be joined.

According to the friction stir welding apparatus for overlapped joints 1 of the second embodiment, because channel-shaped grooves 10 are formed in the peripheral surface of the probe 5 along the direction of the center axis of the probe 5 and extending from the tip 5a of the probe 5, when the rotor 4 is caused to rotate, it is possible to cause horizontal flow of the members to be joined 2, 3 in the region surrounding the probe 5 by the concavity and convexity in the peripheral surface of the probe 5. When this occurs, because the upward and downward flow of the members to be joined 2, 3 occurring because of the helical groove 7 is suppressed by this horizontal flow of the members 2, 3, it is possible to effectively prevent the upward curling of the oxide film at the boundary plane 8 between the members to be joined 2, 3.

Also, according to the friction stir welding apparatus 1 of the second embodiment, because the channel-shaped grooves 10 extend from the tip 5a of the probe 5 to a position beyond the boundary plane 8 between the members to be joined 2, 3 when the probe 5 is inserted into the pair of overlapped members to be joined 2, 3, the horizontal flow in the region near the members to be joined 2, 3 becomes greater, enabling more effective suppression of upward and downward flow in the region near the boundary plane 8 between the members to be joined 2, 3. As a result, it is possible to more effectively prevent the upward curling of the oxide film.

While the present invention is described above with regard to embodiments, it is not restricted to the description thereof in the embodiments, and can take on a variety of forms and variations based on the technical concept of the present invention.

Although in the first and second embodiments described above, the helical groove 7 is formed to have a V-shaped cross-section, the cross-section may have another shape, such as an arc shape or a rectangular shape.

Also, although in the second embodiment described above three channel-shaped grooves 10 are formed in the peripheral surface of the probe 5, the number of channel-shaped grooves 10 is not restricted to three, it being sufficient if at least one is provided in the peripheral surface of the probe 5.

Furthermore, although in the second embodiment described above the cross-section of the channel-shaped groove is arc-shaped, it can be another shape, such as V-shaped or rectangular.

What is claimed is:

1. A friction stir welding apparatus for forming overlapped joints, said apparatus comprising:
   a rotor having a shoulder and a center axis, and
   a probe protruding from the shoulder of the rotor and also disposed concentrically with the center axis of the rotor, wherein
   a helical groove is formed in a peripheral surface of the probe, from a tip of the probe toward the shoulder,
   an outer diameter of the probe along a valley portion of the groove is substantially constant between the tip of the probe and the shoulder,
   an outer diameter of the probe along a peak portion of the groove gradually decreases from the tip of the probe toward the shoulder, and
   a depth of the groove gradually decreases from the tip of the probe toward the shoulder.

2. A friction stir welding apparatus according to claim 1, wherein the helical groove extends from the tip of the probe to a position adapted to be located beyond a boundary plane between a pair of overlapping members to be joined when the probe is inserted into the members with the shoulder abutting one of the members.

3. A friction stir welding apparatus according to claim 1, further comprising:
   at least one channel-shaped groove in the peripheral surface of the probe and extending from the tip of the probe along a direction of the center axis of the probe.

4. A friction stir welding apparatus according to claim 1, further comprising:
   a plurality of channel-shaped grooves in the peripheral surface of the probe and extending from the tip of the probe along a direction of the center axis of the probe;
   wherein the channel-shaped grooves are positioned circumferentially of the probe at an uniform spacing.

5. A friction stir welding apparatus according to claim 3, wherein the channel-shaped groove extends from the tip of the probe to a position adapted to be located beyond a boundary plane between a pair of overlapping members to be joined when the probe is inserted into the members with the shoulder abutting one of the members.

6. A friction stir welding apparatus according to claim 3, wherein an end part of the channel-shaped groove adjacent the shoulder is arc-shaped, and a cross-section of the channel-shaped groove has the shape of an arc.

7. A friction stir welding apparatus according to claim 4, wherein each said channel-shaped groove extends from the tip of the probe to a position adapted to be located beyond a boundary plane between a pair of overlapping members to be joined when the probe is inserted into the members with the shoulder abutting one of the members.

8. A friction stir welding apparatus according to claim 4, wherein an end part of each said channel-shaped groove adjacent the shoulder is arc-shaped, and a cross-section of the channel-shaped groove has the shape of an arc.

* * * * *